UNITED STATES PATENT OFFICE.

JAMES P. RICHARDSON, OF WASHINGTON, DISTRICT OF COLUMBIA.

IMPROVEMENT IN COMPOSITIONS FOR PAVEMENTS.

Specification forming part of Letters Patent No. 161,550, dated March 30, 1875; application filed August 1, 1874.

*To all whom it may concern:*

Be it known that I, JAMES P. RICHARDSON, of Washington, in the District of Columbia, have invented certain new and useful Improvements in Compositions for Pavements, of which the following is a specification:

My invention relates to a new and improved composition for the formation of pavements, carriage-ways, and the like, and is designed especially as a top dressing for the same, as it is not liable to expand or contract, is not effected by heat or cold, and will not crack or grind up under the carriage-wheels in winter, or blister, slough, or run off under the influence of the sun's rays in summer, as is the case with all compositions hitherto employed for this purpose.

My invention consists of a composition of copal gum, asphaltum, and coal-tar, thoroughly mixed and combined with stone, ashes, or their equivalents, in any proportion that may be desired.

In carrying out my invention, I take about the following proportions, though it is evident that the same may be varied: Copal gum, five pounds; asphaltum, twenty pounds; coal-tar, forty gallons. I thoroughly mix and commingle these by the aid of heat, and when properly combined I add broken stone, ashes, or equivalent materials to form a plastic mass. This I apply hot to the pavement or carriage-way, properly prepared for its reception, by spreading the mass upon the surface in the ordinary manner. I then roll and tamp the mass thoroughly until the same is perfectly solid.

The pavement thus prepared has a smooth surface; but it is of such a nature, nevertheless, that a sure and sufficient foothold is given to the horses and other animals which may travel over the same.

All concrete pavements, as hitherto constructed, either slough or run off during warm weather, or crack or grind up under the carriage-wheels during cold weather. My invention is designed particularly to overcome these defects. My composition is not affected by the heat of the sun in summer, nor by frost in winter, and will remain intact during all changes of weather.

What I claim is—

The composition of copal gum, asphaltum, and coal-tar, alone or mixed with crushed stone, ashes, or equivalent material, for the formation of pavements, carriage-ways, and the like, as herein described.

In testimony that I claim the foregoing I have hereunto set my hand.

JAMES P. RICHARDSON, M. D.

Witnesses:
J. K. ROGERS,
JAMES L. NORRIS.